Dec. 5, 1933.  G. T. MILLER  1,938,529
NUT LOCK
Filed May 31, 1932
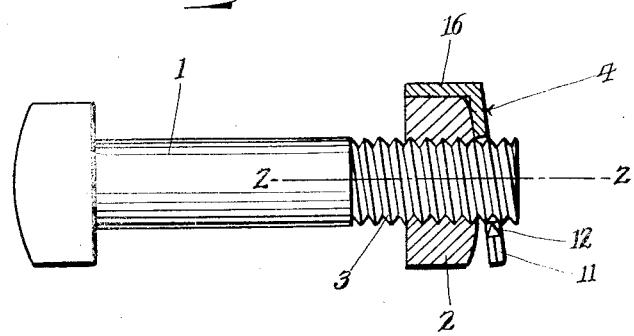
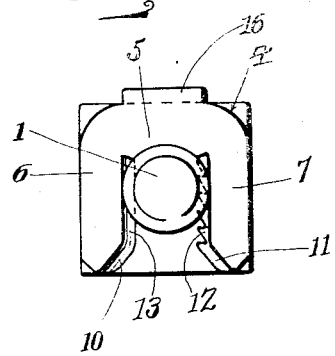
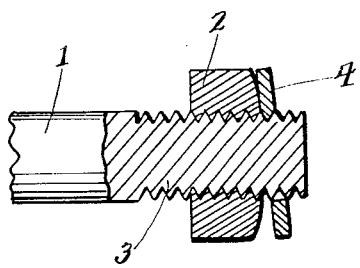
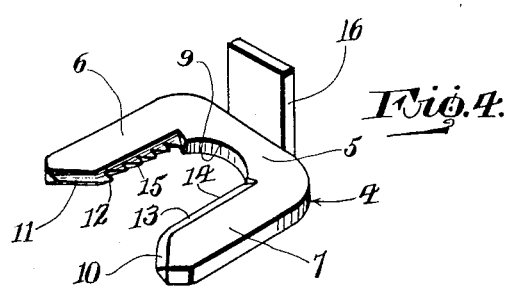
Inventor
George T. Miller
By Geo. T. Kimmel
Attorney Patented Dec. 5, 1933

1,938,529

UNITED STATES PATENT OFFICE 1,938,529

NUT LOCK

George T. Miller, Oakland, Calif.

Application May 31, 1932. Serial No. 614,583

4 Claims. (Cl. 151—30)

This invention relates to an improved nut lock, and the principal object of the same is to provide, in a manner as hereinafter set forth, a nut lock of an extremely simple and economical construction whereby a convention nut and bolt may be securely locked together at any desired position without altering or impairing the efficiency of either the lock or the nut and bolt with which it is used.

A further object of the invention is to provide, in a manner as hereinafter set forth, a nut lock which may be readily placed in operative position or released therefrom and which may be used an infinite number of times without rendering it in any way less efficient for its purpose.

A further object of the invention is to provide, a nut lock which will comply with virtually all statutory requirements or regulations governing the use of such devices.

With the foregoing and other objects in view, not at this time more particularly enumerated, but which will be readily apparent; this invention consists in the novel construction and arrangement of parts, more particularly set forth and described and embodied in the claims hereunto appended. It is to be understood, that changes and modifications may be resorted to which fall within the scope of the invention as claimed.

Referring now to the drawing, which is merely illustrative of one form of the invention, like numerals indicate like parts throughout the several views:

Figure 1 is a side elevation of a bolt together with a sectional nut and nut lock showing the relative position of the lock as it engages the threads of the bolt and the peripheral face of the nut.

Figure 2 is a section on line 2—2 of Figure 1.

Figure 3 is an end view of a bolt and nut equipped with a nut lock embodying the invention.

Figure 4 is a perspective view of the nut lock.

In the drawing, 1 indicates an ordinary bolt, 2 a nut upon the theaded end 3 thereof, and 4 the nut lock of my invention.

The nut lock 4 is formed of a flattened piece of resilient metal generally U-shaped in contour having a central portion 5 and a pair of locking arms 6, 7 arranged in opposed parallel spaced relation and integral with portion 5. The outer sides of the arms are flushed with the ends of portion 5. The latter has rounded outer corners and an arcuate inner side edge 9 to provide a seat for the bolt 1.

The arms 6, 7 are tapered at their free ends. The angle of the inner side of each free end is approximately sixty degrees for the purpose of enabling an unskilled or careless workman to more easily start the lock upon the bolt with which it is to be used while at the same time reducing to a minimum the possibility of injury to the threads of the latter.

The free ends are squared at their outer sides and beveled as at 10, 11 at their inner sides. Each arm 6, 7 has its inner side oppositely beveled throughout from the beveled inner sides of its free ends to the portion 5. The bevels on the inner sides of the arms 6, 7 are indicated 12, 13 respectively. The bevel 12 provides a knife edge 14 for guiding the lock when the latter is being placed in operative relation to a bolt and assists in retaining the lock in such relation. The bevel 13 is formed with a series of ratchet teeth 15 which point inwardly of the lock, that is to say in a direction towards central portion 5. The space between the arms 6, 7 is of a less width than the smallest diameter of the threaded portion of the bolt which they engage, for the purpose of enabling the arms to resiliently engage the bolt.

A rectangular lip 16 is formed integrally with the portion 5 and extends at substantially right angles with respect to the same from the outer side edge of the latter. This lip is intended to abut the peripheral face of the nut 2 so that rotation of the nut 2 upon the bolt will be prevented even in the event that the arms of the lock are not placed in the threads of the bolt which are nearest the outer face of the nut. The width of the lip corresponds substantially to the diameter of the bolt.

In operation, the nut is screwed upon the bolt to the desired point, the lock is then driven upon the threaded end of the bolt adjacent the outer face of the nut in such a manner that the lip of the lock will abut the peripheral face of the nut and the bolt will seat in the seat provided for its reception. The knife edge of the lock will enter in and engage the convolutions of the threads of the bolt to guide the lock up against the outer face of the nut, while the toothed edge of the lock will retain the lock securely in position by engaging the bolt on the side opposite to that in which the knife edge acts.

Having thus fully described my invention, what I claim is:—

1. A nut lock comprising a nut locking member including a central portion, a pair of spaced parallel arms and a lip, each of said arms merging at one end into the inner side of said central portion and having a tapered free end part, each of said arms being of substantially uniform width from the inner end of its tapered end part to its point of mergence with said central portion and having its inner edge oppositely beveled from said central portion to the outer terminus of its tapered free end part, one of said arms having its beveled inner edge formed with a row of teeth extending from the inner side of said central portion to the inner end of the tapered free end portion of the arm, that part of the beveled inner edge of each arm between its tapered free end part and said central portion being straight, and said lip being integral with the outer side of said central portion adjacent the ends of the latter and disposed at right angles to said arms.

2. A nut lock comprising a nut locking member including a central portion, a pair of spaced parallel arms and a lip, each of said arms merging at one end into the inner side of said central portion and having a tapered free end part, each of said arms being of substantially uniform width from the inner end of its tapered end part to its point of mergence with said central portion and having its inner edge oppositely beveled from said central portion to the outer terminus of its tapered free end part, one of said arms having its beveled inner edge formed with a row of teeth extending from the inner side of said central portion to the inner end of the tapered free end portion of the arm, that part of the beveled inner edge of each arm between its tapered free end part and said central portion being straight, and said lip being integral with the outer side of said central portion adjacent the ends of the latter and disposed at right angles to said arms, said teeth pointing in a direction towards said central portion.

3. A nut lock comprising a nut locking member for seating on a threaded bolt portion and including a central portion and a pair of spaced parallel arms for positioning against the threaded portion of the bolt, each of said arms merging at one end into the inner side of said central portion and having a tapered free end part of V-shaped contour, the inner side edge of each tapered part being disposed substantially at an angle of 60°, each of said arms being of substantially uniform width from the inner end of its tapered end part to its point of mergence with said central portion and having its inner edge oppositely beveled for engagement with the threads of the bolt, one of said arms having its oppositely beveled inner edge formed with a row of teeth extending from the inner side of said central portion to the inner end of the tapered free end part of the arm, that stretch of the beveled inner edge of each arm extending from the inner end of its tapered free end part to said central portion being straight and the distance between the said stretches being less than that of the smallest diameter of the threaded portion of the bolt to be engaged by said arms to provide for the arms resiliently engaging the bolt.

4. A nut lock comprising a nut locking member for seating on a threaded bolt portion and including a central portion and a pair of spaced parallel arms for positioning against the threaded portion of the bolt, each of said arms merging at one end into the inner side of said central portion and having a tapered free end part of V-shaped contour, the inner side edge of each tapered part being disposed substantially at an angle of 60°, each of said arms being of substantially uniform width from the inner end of its tapered end part to its point of mergence with said central portion and having its inner edge oppositely beveled for engagement with the threads of the bolt, one of said arms having its oppositely beveled inner edge formed with a row of teeth extending from the inner side of said central portion to the inner end of the tapered free end part of the arm, that stretch of the beveled inner edge of each arm extending from the inner end of its tapered free end part to said central portion being straight and the distance between the said stretches being less than that of the smallest diameter of the threaded portion of the bolt to be engaged by said arms to provide for the arms resiliently engaging the bolt, said tapered parts having their inner side edges of the same length and of greater length than the outer side edges thereof, and said teeth pointing in a direction towards said central portion.

GEORGE T. MILLER.